United States Patent [19]

Fries

[11] 4,328,700
[45] May 11, 1982

[54] LEAK DETECTION METHOD AND APPARATUS

[75] Inventor: Bernard A. Fries, Orinda, Calif.

[73] Assignee: Chevron Research Company, San Francisco, Calif.

[21] Appl. No.: 777,389

[22] Filed: Mar. 14, 1977

[51] Int. Cl.³ .............................................. G01M 3/22
[52] U.S. Cl. ....................................... 73/40.7; 73/1 G
[58] Field of Search ....................... 73/40.7, 40.5 R, 40, 73/1 G; 23/230 L

[56] References Cited

U.S. PATENT DOCUMENTS

| | | | |
|---|---|---|---|
| 3,425,264 | 2/1969 | Frei | 73/40.7 X |
| 3,522,008 | 7/1970 | Defabaugh et al. | 23/230 L |
| 3,790,345 | 2/1974 | Mansfield | 73/40.5 R X |

FOREIGN PATENT DOCUMENTS

| | | | |
|---|---|---|---|
| 678544 | 1/1964 | Canada | 73/40.7 |
| 2329549 | 1/1975 | Fed. Rep. of Germany | 73/40.7 |
| 2420464 | 11/1975 | Fed. Rep. of Germany | 73/40.7 |

OTHER PUBLICATIONS

Knoepke, J., *Tracer-gas System Determines Flow Volume of Flue Gases*, In. Chem. Eng., pp. 91-94, Jan. 31, 1977.

*Primary Examiner*—Kyle L. Howell
*Assistant Examiner*—Joseph W. Roskos
*Attorney, Agent, or Firm*—J. A. Buchanan, Jr.; D. A. Newell; M. K. Bosworth

[57] ABSTRACT

A method and apparatus are disclosed for detecting leaks in fluid processing systems using sulfur hexafluoride as a tracer. Leak detection can be carried out with the processing system continuing in operation by using the apparatus according to the method of the invention, so that shutting down any part of the processing system in order to check for leakage can be avoided.

2 Claims, 1 Drawing Figure

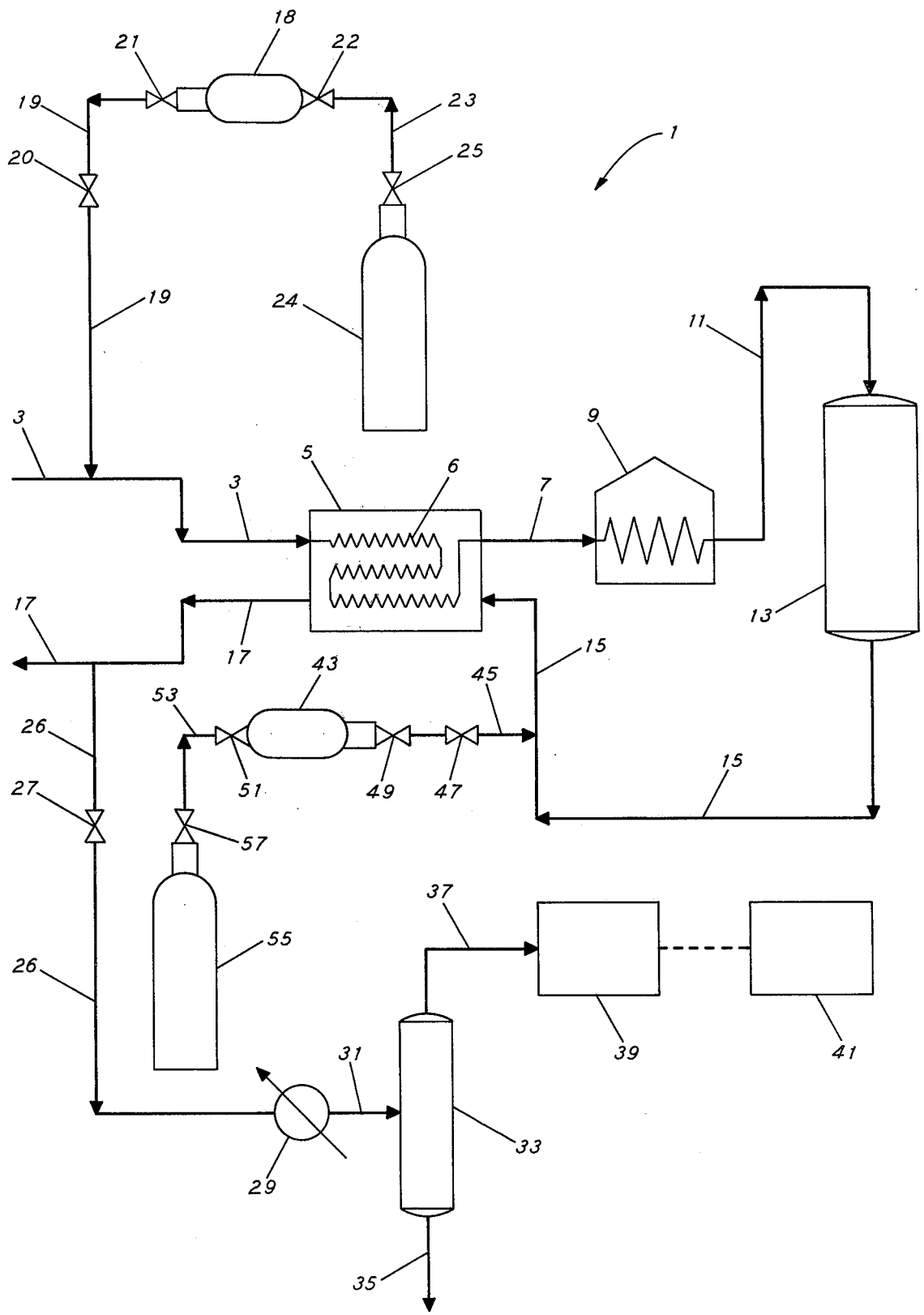

LEAK DETECTION METHOD AND APPARATUS

BACKGROUND OF THE INVENTION

The present invention relates to a method and apparatus for detecting internal leakage between streams in fluid processing equipment.

Various methods have been proposed for detecting leaks between internal streams in fluid processing systems such as heat exchangers, incinerators, etc. Generally, such conventional leak detection operations require that all or a part of the processing system be shut down before the leak detection procedure can be undertaken. Some leak detection procedures employ radioactive substances, necessitating the use of specially trained personnel and elaborate safety precautions. Although radioactive tracer leak detection operates successfully, the inconvenience associated with the use of radioactive materials has provided an incentive to seek alternative, superior methods for detecting leaks in processing equipment.

Sulfur hexafluoride has been suggested for use as a tracer in detecting leaks in buried gas pipelines. A quantity of sulfur hexafluoride is introduced into the pipeline, and the soil adjacent to the pipeline is tested for the presence of sulfur hexafluoride by digging test holes and sampling the air in the holes. Several types of apparatus for detecting sulfur hexafluoride in very small quantities in other gases such as air are commercially available, most if not all of them including some form of electron capture detection cell for measuring the amount of sulfur hexafluoride in a gaseous atmosphere. Other electron-capturing gases such as organic chlorides and organic fluorides have also been used for the same purpose.

SUMMARY OF THE INVENTION

In an embodiment, the present invention relates to apparatus for detecting leakage through a partition separating a portion of a first path from a portion of a second path in a fluid processing system, while operation of the system is continued, the apparatus comprising in combination: means for introducing a known quantity of sulfur hexafluoride into fluid flowing in the first path upstream of the partition; means for continuously removing a sample of fluid flowing in the second path at a locus downstream of the partition; means for removing normally liquid components from the sample; means for testing the sample to determine the presence of sulfur hexafluoride therein; and means for indicating the amount of sulfur hexafluoride in the sample. Preferably the apparatus as defined above further includes means for introducing a known quantity of sulfur hexafluoride into the second path at a locus upstream of the partition.

In another embodiment, the present invention relates to a method employed in a fluid processing system wherein fluid flow in a first path and a second path, with a partition separating a portion of the first path from a portion of the second path, the method providing for detecting leakage through the partition while continuing operation of the processing system and comprising the steps of: (a) introducing sulfur hexafluoride into the first path upstream of the partition; (b) sampling fluid in the second path at a sampling locus downstream of the partition; and (c) testing the sample for the presence of sulfur hexafluoride.

In addition to the steps mentioned above, the method employed according to the present invention preferably includes the further steps, carried out prior to step (a), of: (1) introducing sulfur hexafluoride into the second path upstream of the partition; (2) continuously sampling fluid at the sampling locus; (3) testing the resulting sample for the presence of sulfur hexafluoride; and (4) measuring the period of time after step (1) until the presence of sulfur hexafluoride is detected in step (3), for estimating the period of time required for sulfur hexafluoride introduced in step (a) to reach the sampling locus if an opening exists between the first and second paths through the partition.

One preferred type of fluids processing equipment in which the present invention can be employed is heat exhangers.

DESCRIPTION OF THE DRAWING

The attached FIGURE shows a schematic representation of preferred embodiment of the apparatus of the present invention and illustrates its use according to the method of the invention in detecting a leak in a heat exchanger employed in a fluid hydrocarbon processing system.

DETAILED DESCRIPTION OF THE INVENTION

The present invention can best be understood by reference to the attached drawing. It will be understood that the invention is not thereby limited to the specific embodiment shown, and that the scope of the invention includes the alternatives, modifications and equivalents of the depicted embodiment which are encompassed in the appended claims.

Turning to the drawing, there is shown a hydrocarbon conversion system 1, into which a fluid hydrocarbon-containing feed is introduced by way of a first path in the system via a conduit 3. The feed stream passes into a heat exchanger 5, and is partially heated by passing it through a plurality of heat exchange tubes 6 in the heat exchanger 5. Feed is withdrawn from the exchanger 5 and passed through a conduit 7 into a furnace 9. The feed is heated to the desired reaction temperature in the furnace 9 and is then passed through a conduit 11 into a hydrocarbon conversion reactor 13. After the hydrocarbons have been processed in the conversion reactor 13, which may contain a conversion catalyst, a product stream is removed into a second path in the processing system through a conduit 15 and is passed into the exchanger 5. The relatively hot reactor effluent fluid is then heat exchanged with the relatively cold feed from the conduit 3 by flowing the hotter fluid around the heat exchange tubes 6 within the exchanger 5. The heat exchange tubes 6 act as a partition, separating the cooler fluid in the first path in the tubes 6 from the hotter fluid in the second path around the tubes 6 in the exchanger 5. After the heat exchange procedure has been carried out, the partially cooled product stream is then removed from the system for further treatment via a conduit 17.

It will be apparent that the heat exchanger 5 is an integral part of the processing system 1, and that shutting down the heat exchanger 5 would necessitate shutting down the whole system if it were necessary to remove the heat exchanger 5 from service in order to check for leakage therein. Unfortunately, in a typical hydrocarbon conversion system of the type shown, leakage of fluid from the feed stream into the product stream results in contamination of the product stream with unprocessed, unconverted hydrocarbons. Thus, for example, lower-octane feed components in the hydrocarbon feed stream can contaminate a higher-octane product stream, adversely affecting the quality of the product. In this type of operation, when analysis of the product stream shows that the product quality is lower than is to be expected, the cause of the drop in product quality may be found in one or more of several sources, e.g., catalyst failure, feed contamination, control failure, etc., in addition to the possibility of a leak in the heat exchanger 5 from the feed stream into the product stream. Thus, it is desirable to be able to determine if leakage is present from the feed stream in the tubes 6 into the product stream in the exchanger 5, and, if so, what the size of leak is. It is also desirable to determine whether leakage has occurred without shutting down the whole system, as a complete shutdown has serious adverse economic consequences.

According to the invention, apparatus is provided for detecting leakage through the heat exchange tubes 6 from the fluid flowing into the tubes 6 into fluid flowing around the tubes 6 within the exchanger 5. Means are provided for introducing a known quantity of sulfur hexafluoride into the feed flowing in the conduit 3, such as a cylinder 18 filled with a measured amount of sulfur hexafluoride under a pressure higher than the pressure in the conduit 3. The cylinder 18 is connected via conduit 19 to the conduit 3, with a valve 20 operatively connected into the conduit 19. The cylinder 18 includes valves 21 and 22 at either end. The cylinder 18 is connected by a conduit 23 to an inert gas cylinder 24, which has a valve 25 connected therein. The inert gas cylinder is used for introducing the sulfur hexafluoride into the line 3, as more fully described below. The cylinder 24 contains an inert gas such as nitrogen, helium or argon at a pressure higher than the pressure in the conduit 3. Means are also provided for continuously removing a sample of the product fluids flowing within the conduit 17, such as a conduit 26 attached to the conduit 17 with a valve 27 operatively connected into the conduit 26. When the valve 27 is opened, fluids are conducted through the conduit 26 to means which are provided for removing normally liquid components from the sample, such as a cooler 29, connected by a conduit 31 to a liquid-vapor separator vessel 33. Liquid components gravity-separating in the vessel 33 are removed through a conduit 35 and may be discarded. The conduit 35 has a valve 36 connected therein, so that a liquid level seal can be maintained in the vessel 33 to prevent gas from flowing through the conduit 35. The gaseous sample is then passed through a conduit 37 to means provided for testing the sample to determine the presence of sulfur hexafluoride therein, such as an electron-capture measurement cell and indicator 39, which is connected to an indicator and recorder 41, for visually indicating and recording the relative concentration of sulfur hexafluoride in the sample. The use of the sulfur hexafluoride detector and the recorder allows the amount of sulfur hexafluoride in a sample to be determined on an absolute basis, after the instruments have been calibrated in a manner to be described hereinafter. For calibrating the testing and indicating apparatus 39 and 41, means are provided for introducing a known quantity of sulfur hexafluoride into the fluid flowing within the conduit 15 at a point upstream of the heat exchanger 5, such as a cylinder 43 which is filled with a measured amount of sulfur hexafluoride under a pressure higher than the pressure of the fluids flowing in the conduit 15. The cylinder 43 is connected to the conduit 15 by way of a conduit 45, with a valve 47 operatively connected into the conduit 45. The cylinder 43 includes valves 49 and 51 therein. The cylinder 43 is connected by a conduit 53 to an inert gas cylinder 55 which has a valve 57 connected therein. The cylinder 55 contains an inert gas at a pressure higher than the pressure in the conduit 15.

In operation of the apparatus according to a preferred embodiment of the method, prior to carrying out tests with sulfur hexafluoride, it is advantageous to line out the readings from the testing device 39 to establish a base line reading on the recorder 41 in the absence of any sulfur hexafluoride. The valve 27 is adjusted to permit a sample of the fluid in the conduit 17 to continuously through the conduit 26 at the desired rate. Condensable components in the sample are continuously removed therefrom by cooling the sample in the cooler 29 and separating liquids in the gravity separator vessel 33. A level of liquid is maintained in the bottom of the separator vessel 33 by adjusting the valve 36 on the line 35. This prevents the gaseous sample from being lost through the conduit 35. The continuously flowing gaseous sample is then conducted to the electron-capture measurement and indicating device 39, in which the sample is continuously tested for the presence of sulfur hexafluoride, with the result being continuously read out on the recorder 41 for visual inspection.

According to this invention, the response of the instruments 39 and 41 to a measured concentration of sulfur hexafluoride in the fluids in the conduit 17 is preferably determined. The fluid in the conduit 17 is continuously sampled at any convenient rate. The valves 57 and 51 are opened, allowing the high pressure inert gas in the cylinder 55 to flow through the conduit 53 into the sulfur hexafluoride cylinder 43. The valves 47 and 49 are then opened for a period of time sufficient for the inert gas to carry substantially all the sulfur hexafluoride from the cylinder 43 through the conduit 45 into the conduit 15, allowing a measured quantity of sulfur hexafluoride to flow in a pulse through the conduit 45, the conduit 15, and the heat exchanger 5 into the conduit 17, while the fluid in the conduit 17 is being continuously sampled as indicated above. The response of the sulfur hexafluoride measurement instrument and indicator 39 in the recorder 41 to the pulse of sulfur hexafluoride in the calibration sample, is then determined, and the amplitude of the response of the devices to the calibration pulse of sulfur hexafluoride of known size allows establishment of a quantitative standard for determining the size of any leak thereafter detected by the amount of sulfur hexafluoride in the sample. The use of the pulsed calibrating sample supplied from the cylinder 43 is also useful for estimating the period of time required for sulfur hexafluoride to travel in the fluids flowing through the system from the exchanger 5 through the conduit 17 to the sampling point at the conduit 26. Such a determination is desirable in cases, such as in the embodiment depicted, in which some sulfur hexafluoride from the leak-testing sulfur hexafluoride pulse (which is discharged from the cylinder 19 through the conduit 3) may reach the fluid to be sampled for sulfur hexafluoride (if it is not decomposed in the system) after a certain period of time, generally much longer than the period of time required for sulfur hexafluoride to reach the detection apparatus via a leak. This may occur via feed-effluent heat exchange, effluent recycle, etc.

After the pulse of sulfur hexafluoride has been passed into the conduit 15, the valves 47, 49, 51 and 57 are closed, halting the flow of inert gas from the cylinder 55.

After the calibration and response period estimation have preferably been carried out, the test for leakage in the heat exchange tubes 6 is commenced. The fluid in the conduit 17 is sampled, preferably continuously, at a convenient rate. The valves 25 and 22 are opened, allowing the high pressure inert gas in the cylinder 24 to flow through the conduit 23 into the sulfur hexafluoride cylinder 18. The valves 20 and 21 are then opened for a period of time sufficient for the inert gas to carry all the sulfur hexafluoride from the cylinder 18 through the conduit 19 into the conduit 3, introducing a predetermined amount of sulfur hexafluoride into the conduit 3. After the pulse of sulfur hexafluoride has been passed into the conduit 3, the valves 47, 49, 51 and 57 are closed, halting the flow of inert gas from the cylinder 24. The sulfur hexafluoride pulse is carried through the conduit 21 and the heat exchange tubes 6. If a leak exists in the tubes 6, some sulfur hexafluoride will pass through the tubes 6, enter the hotter fluid, and exit the heat exchanger 5 into the conduit 17. A sample of this sulfur hexafluoride-containing fluid then passes through the conduit 25. After preferably being cooled and having liquid components removed therefrom, it is tested in the electron-capture measurement and indicator instrument 39, with the amount of sulfur hexafluoride in the sample being shown by the size of the response which can be read out on the recorder 41.

A preferred embodiment of the method and apparatus of the invention having been described, a variety of equivalents, modifications and alternatives within the spirit of the present invention and within the scope of the following claims will be apparent to those skilled in the art.

What is claimed is:

1. In a fluid processing system wherein fluids flow in a first path and a second path, with a partition separating a portion of said first path from a portion of said second path, the method for detecting leakage through said partition while continuing operation of said system, which comprises the steps of:
   (1) introducing sulfur hexafluoride into said second path upstream of said partition;
   (2) continuously sampling fluid at a sampling locus;
   (3) testing the resulting calibration sample for the presence of sulfur hexafluoride;
   (4) measuring the period of time after step (1) until the presence of sulfur hexafluoride is detected in step (3);
   (5) estimating the period of time required for sulfur hexafluoride introduced into said first path upstream of said partition to reach said sampling locus if an opening exists between said first and second paths through said partition;
   (6) introducing sulfur hexafluoride into said first path upstream of said partition;
   (7) sampling fluid in said second path at said sampling locus downstream of said partition; and
   (8) testing said sample for the presence of sulfur hexafluoride.

2. Apparatus for detecting leakage through a partition separating a portion of a first path from a portion of a second path in a fluid processing system while operation of said system is continued, comprising in combination:
   means for introducing a known quantity of sulfur hexafluoride into fluid flowing in said first path upstream of said partition;
   means for continuously removing a sample of fluid flowing in said second path at a sampling locus downstream of said partition;
   means for removing normally liquid components from said sample;
   means for continuously testing the resulting gaseous sample to determine the presence of sulfur hexafluoride therein;
   means for continuously indicating the amount of sulfur hexafluoride in said gaseous sample; and
   means for introducing a known quantity of sulfur hexafluoride into said second path upstream of said partition.

* * * * *